United States Patent
Chae et al.

(10) Patent No.: US 8,335,957 B2
(45) Date of Patent: Dec. 18, 2012

(54) APPARATUS AND METHOD FOR ALLOCATING ACK/NACK CHANNEL IN WIRELESS COMMUNICATION SYSTEM

(75) Inventors: Seong-Hyeon Chae, Seongnam-si (KR); Se-Ho Kim, Seoul (KR); Young-Bo Cho, Seongnam-si (KR); Hee-Won Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 12/655,729

(22) Filed: Jan. 6, 2010

(65) Prior Publication Data

US 2010/0174961 A1    Jul. 8, 2010

(30) Foreign Application Priority Data

Jan. 6, 2009  (KR) .................. 10-2009-0000957

(51) Int. Cl.
*G08C 25/02*    (2006.01)
(52) U.S. Cl. ....................... 714/748; 714/749
(58) Field of Classification Search .................. 714/748, 714/749
See application file for complete search history.

(56) References Cited

U.S. PATENT DOCUMENTS

| | | | |
|---|---|---|---|
| 2001/0026543 A1* | 10/2001 | Hwang et al. | 370/335 |
| 2001/0046220 A1* | 11/2001 | Koo et al. | 370/335 |
| 2001/0053140 A1* | 12/2001 | Choi et al. | 370/335 |
| 2003/0060207 A1* | 3/2003 | Sugaya et al. | 455/450 |
| 2004/0224697 A1* | 11/2004 | Hakkinen et al. | 455/450 |
| 2004/0228287 A1* | 11/2004 | Seol et al. | 370/252 |
| 2004/0252662 A1* | 12/2004 | Cho | 370/329 |
| 2005/0105494 A1* | 5/2005 | Kim et al. | 370/335 |
| 2005/0243768 A1* | 11/2005 | Terry et al. | 370/329 |
| 2007/0124639 A1* | 5/2007 | Shiizaki et al. | 714/748 |
| 2010/0118787 A1* | 5/2010 | Yano et al. | 370/328 |
| 2011/0078530 A1* | 3/2011 | Shiizaki et al. | 714/749 |

* cited by examiner

*Primary Examiner* — Yolanda L Wilson (57) ABSTRACT

An apparatus is capable of allocating an ACK/NACK channel in a wireless communication system. The apparatus performs a method for allocating the ACK/NACK channel at a base station that includes generating ACK/NACK channel allocation information of a packet transmitted to a terminal; inserting the ACK/NACK channel allocation information into the packet using a padding area indicative of a size difference of data carried by the packet and an Automatic Repeat Request (ARQ) block; and transmitting the packet comprising the inserted ACK/NACK channel allocation information to a terminal to service.

22 Claims, 7 Drawing Sheets

APPARATUS AND METHOD FOR ALLOCATING ACK/NACK CHANNEL IN WIRELESS COMMUNICATION SYSTEM

CROSS REFERENCE TO RELATED APPLICATION(S) AND CLAIM OF PRIORITY

The present application is related to and claims the benefit of priority under 35 U.S.C. §119(a) to a Korean patent application filed in the Korean Intellectual Property Office on Jan. 6, 2009 and assigned Serial No. 10-2009-0000957, the entire disclosure of which is hereby incorporated by reference.

TECHNICAL FIELD OF THE INVENTION

The present invention relates generally to an apparatus and a method for allocating a channel in a wireless communication system. More particularly, the present invention relates to an apparatus and a method for allocating an ACK/NACK channel for Automatic Repeat Request (ARQ) in the wireless communication system.

BACKGROUND OF THE INVENTION

To elevate data transmission reliability, wireless communication systems control and recover error of data using an Automatic Repeat Request (ARQ) scheme.

Using the ARQ scheme, a receiver sends ACK/NACK information in relation to data received, to a transmitter over an ACK/NACK channel allocated from the transmitter. The transmitter performs retransmission according to the ACK/NACK information received from the receiver. For example, upon receiving the ACK information, the transmitter recognizes that the receiver successfully receives the data, and thus sends new original data. Upon receiving the NACK information, the transmitter recognizes the data is corrupted based on the NACK information and thus retransmits the original data in response to the NACK information.

The ARQ scheme is classified to a synchronous ARQ scheme and an asynchronous ARQ scheme based on the data retransmission type.

In the asynchronous ARQ scheme, the transmitter retransmits the data by re-determining a retransmission time, a coding rate, and a resource region according to channel condition.

In the synchronous ARQ scheme, the transmitter retransmits the data using the same resource as the original data. Accordingly, the transmitter does not have to send a resource allocation message in relation to the retransmitted data. Herein, the resource allocation message includes ACK/NACK channel information for the data.

As stated above, when adopting the synchronous ARQ scheme, a base station does not send the resource allocation message with respect to the retransmitted data. In result, the ACK/NACK channel for the retransmitted data of the terminal using the synchronous ARQ scheme may collide with the ACK/NACK channel for the data of the terminal allocated the fixed resource.

SUMMARY OF THE INVENTION

To address the above-discussed deficiencies of the prior art, it is a primary object to provide at least the advantages described below. Accordingly, an aspect of the present invention is to provide an apparatus and a method for allocating an ACK/NACK channel for Automatic Repeat Request (ARQ) in a wireless communication system.

Another aspect of the present invention is to provide an apparatus and a method for allocating an ACK/NACK channel with respect to a synchronous ARQ scheme and a fixed allocation scheme in a wireless communication system.

Yet another aspect of the present invention is to provide an apparatus and a method for allocating an ACK/NACK channel using a padding area of a packet at a base station of a wireless communication system.

Still another aspect of the present invention is to provide an apparatus and a method for determining an ACK/NACK channel with respect to a received packet using ACK/NACK channel information in a padding area of the packet at a terminal of a wireless communication system.

According to one aspect of the present invention, a method for transmitting ACK/NACK channel allocation information at a base station in a wireless communication system, includes generating ACK/NACK channel allocation information of a packet transmitted to a terminal; inserting the ACK/NACK channel allocation information into the packet using a padding area indicative of a size difference of data carried by the packet and an Automatic Repeat Request (ARQ) block; and transmitting the packet comprising the inserted ACK/NACK channel allocation information to a terminal to service.

According to another aspect of the present invention, a method for determining an ACK/NACK channel at a terminal in a wireless communication system includes when a packet received from a base station comprises ACK/NACK channel allocation information, detecting error of the ACK/NACK channel allocation information; when the ACK/NACK channel allocation information is free from error, determining an ACK/NACK channel with respect to the received packet based on the ACK/NACK channel allocation information; and transmitting ACK information or NACK information for the packet over the ACK/NACK channel according to absence or presence of the error of the packet.

According to yet another aspect of the present invention, an apparatus for transmitting ACK/NACK channel allocation information at a base station in a wireless communication system includes a packet constitutor that can generate a packet by inserting ACK/NACK channel allocation information for a packet using a padding area indicative of a size difference of data carried by the packet and an ARQ block; and a transmitter that can transmit the packet comprising the inserted ACK/NACK channel allocation information to a terminal to service.

According to still another aspect of the present invention, an apparatus for determining an ACK/NACK channel at a terminal in a wireless communication system includes a receiver that can receive a signal; an ACK/NACK channel confirmer for, when ACK/NACK channel allocation information carried by a packet received through the receiver is free from error, determine an ACK/NACK channel with respect to the packet received through the receiver based on the ACK/NACK channel allocation information; and a controller that can transmit ACK information or NACK information for the packet over the ACK/NACK channel according to absence or presence of the error of the packet.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for allocating an ACK/NACK channel for Automatic Repeat Request (ARQ) in a wireless communication system. Herein, the ARQ covers both of Hybrid ARQ (HARQ) and ARQ of Media Access Control (MAC) layer.

Hereinafter, a base station of the wireless communication system transmits a packet by inserting ACK/NACK channel allocation information in order to reduce overhead in the ACK/NACK channel allocation. For example, the base station sends the ACK/NACK channel allocation information using padding bits as shown in FIG. 1.

Figure 1:
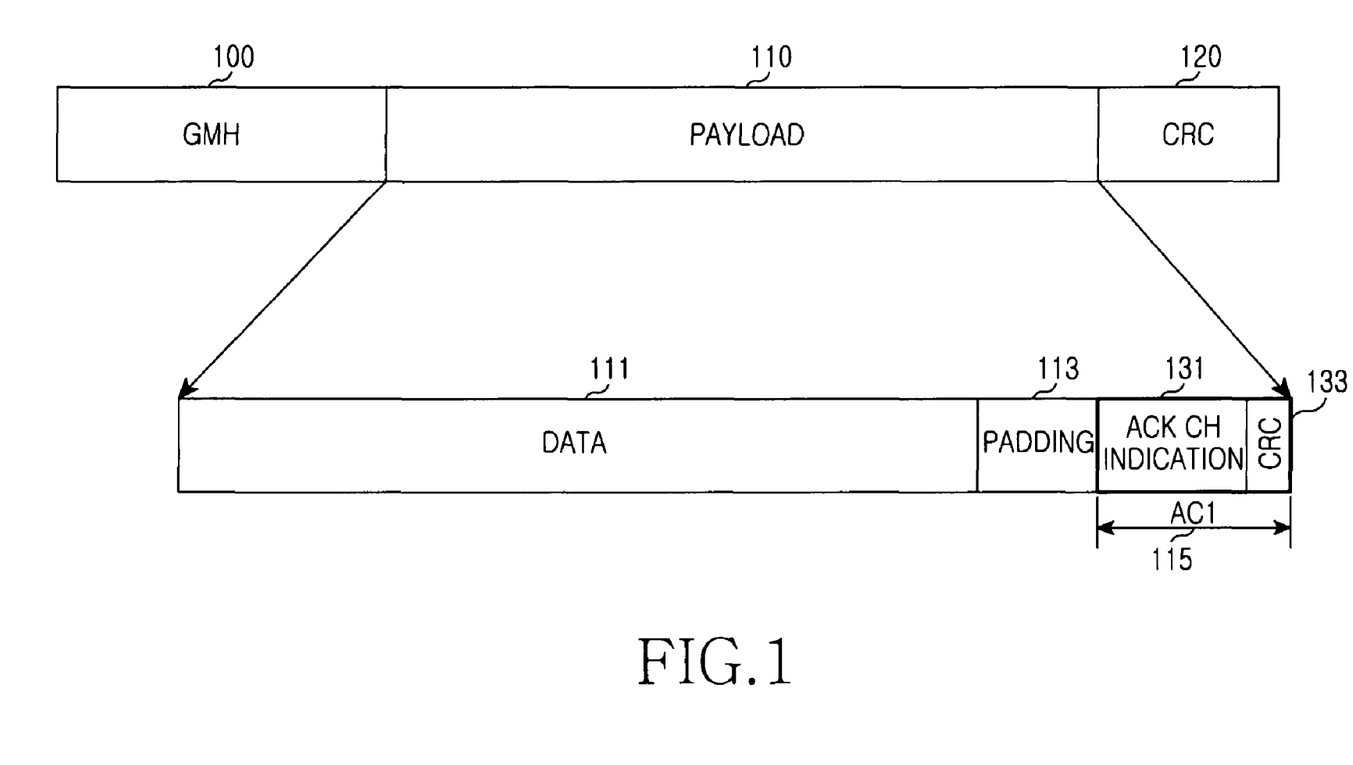
FIG. 1 illustrates a packet structure in a wireless communication system according to an exemplary embodiment of the present invention.

FIG. 1 depicts a packet structure in the wireless communication system according to an exemplary embodiment of the present invention.

The packet constituted to be transmitted from the base station to a terminal includes a Generic MAC Header (GMH) 100, a payload 110, and a Cyclic Redundancy Check (CRC) 120 as shown in FIG. 1.

The GMH 100 carries packet constitution information. For example, the packet constitution information includes type information of the GMH 100, length information of the payload, and connection identifier information of the terminal which is to receive the packet. The packet constitution information may carry ACK channel indication information indicative of whether the payload 110 includes an ACK Channel Indicator (ACI) 115. Herein, the ACI 115 represents ACK/NACK channel allocation information with respect to data.

The payload 110 includes data to send to the terminal 111 and the ACI 115. The payload 110 may include padding bits 113 to make the sum of the data 111 and the ACI 115 equal the size of the ARQ block. The padding bits 113 are positioned between the data 111 and the ACI 115. Alternatively, the padding bits 113 may be positioned between the ACI 115 and the CRC 120.

The ACI 115 includes an ACK/NACK channel indication 131 indicative of location information of the ACK/NACK channel, and a CRC 133 for determining error of the ACI 115. Alternatively, the base station may constitute the ACI 115 which includes only the ACK/NACK channel indication 131.

The CRC 120 includes information for the terminal receiving the packet to detect the error of the packet.

As described above, the base station transmits the packet to the terminal by inserting the retransmission data according to the synchronous HARQ which does not send a resource allocation message, and the ACK/NACK channel allocation information for the fixedly allocated data. Mostly, the padding bits 113 are used to equally define the sizes of the data 111 and the ARQ block in the payload 110. Accordingly, the ACI 115 is inserted to the payload 110 using the padding bit area 113. The base station can insert the ACI 115 to the payload 110 by varying a modulation order of the ACI 115 based on the channel condition of the terminal.

When the modulation order of the ACI 115 varies according to the channel condition of the terminal, the upper layer which constitutes the packet should acquire information of the ACI 115 to be inserted to the packet. For doing so, it is necessary to establish a path between the physical layer where the ACI 115 is generated and the upper layer to exchange the ACI information.

In the following, a method for inserting the ACK/NACK channel allocation information to the padding bits at the base station is explained. The base station inserts the ACI to the payload regardless of the size of the padding bits as shown in FIG. 2.

Figure 2:
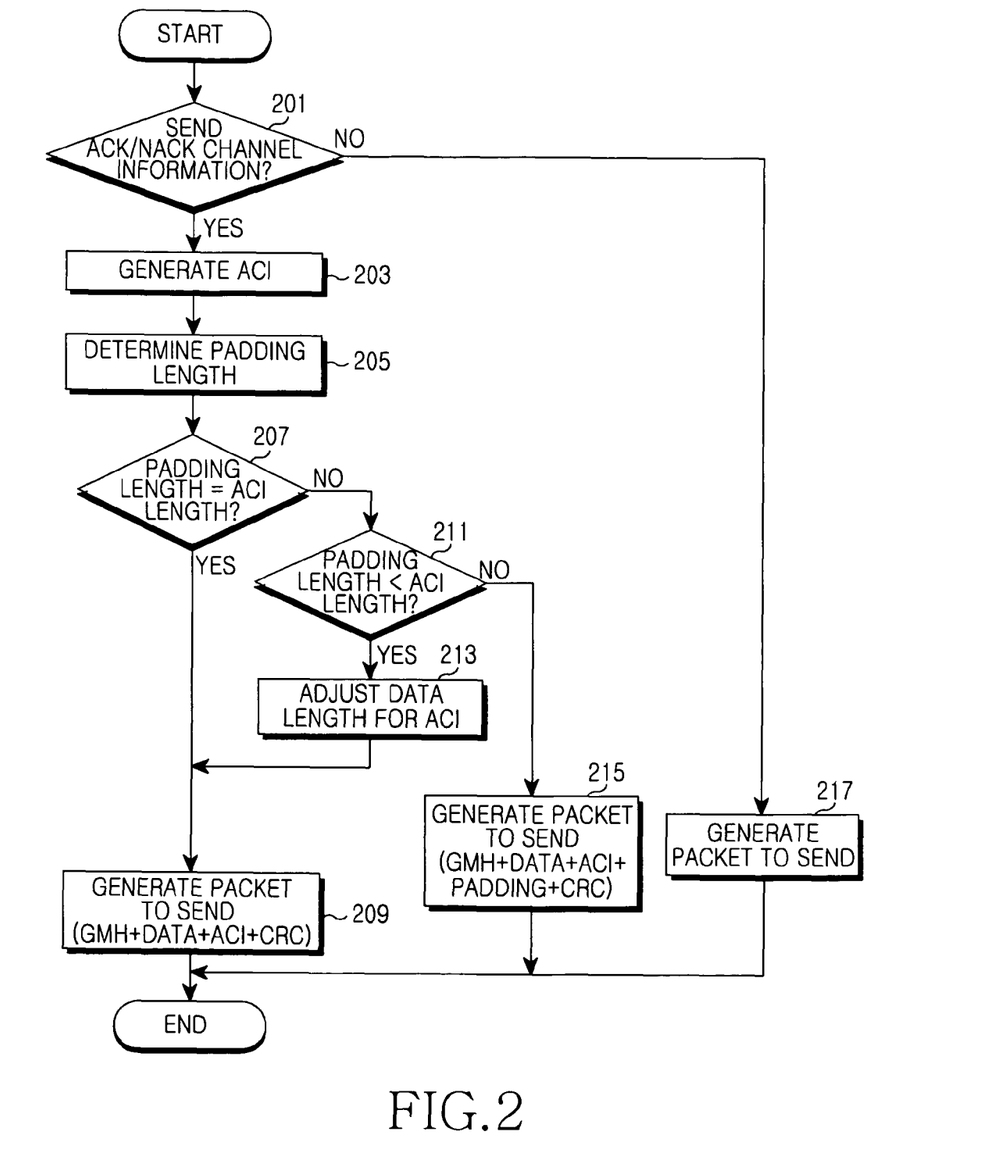
FIG. 2 illustrates a method for constituting a packet at a base station according to an exemplary embodiment of the present invention.

FIG. 2 illustrates a method for constituting the packet at the base station according to an exemplary embodiment of the present invention.

In step 201, the base station determines whether to send the ACK/NACK channel information in relation to the data transmitted to the terminal.

When not sending the ACK/NACK channel information for the data, the base station generates the packet in step 217. For example, the base station constitutes the packet with the GMH, the payload, and the CRC. In so doing, the base station constitutes the payload to include the data and the padding bits. Alternatively, when the sizes of the data and the ARQ block are equal, the base station may constitute the payload to include only the data.

By contrast, when sending the ACK/NACK channel information for the data, the base station generates the ACI including the ACK/NACK channel allocation information with respect to the data transmitted to the terminal in step 203. For example, the base station constitutes the ACI 115 including the ACK/NACK channel indication 131 and the CRC 133 for the ACI 115 as shown in FIG. 1. Alternatively, the base station may constitute the ACI 115 including the ACK/NACK channel indication 131.

In step 205, the base station determines the length of the padding bits. That is, the base station determines the difference of the sizes of the data transmitted to the terminal and the ARQ block.

In step 207, the base station compares the length of the padding bits determined in step 205 with the size of the ACI generated in step 203. That is, the base station determines whether the length of the padding bits is equal to the ACI size.

When the length of the padding bits is equal to the ACI size in step 207, the base station generates the packet to include the ACI in step 209. For instance, the base station constitutes the packet with the GMH, the payload, and the CRC. The base station constitutes the payload to include the data and the ACI. In other words, the base station inserts the ACI into the padding bit area to make the sizes of the data and the ARQ block equal.

By contrast, when the length of the padding bits is different from the ACI size in step 207, the base station determines whether the length of the padding bits is smaller than the ACI size in step 211.

When the length of the padding bits is smaller than the ACI size in step 211, the base station decreases the size of the data enough to insert the ACI to the payload in step 213.

Next, the base station generates the packet to include the ACI in step 209. The base station generates the packet to include the data and the ACI. In other words, the base station adds the ACI by reducing the size of the data carried in the payload of the packet.

When the length of the padding bits is greater than the ACI size in step 211, the base station generates the packet to include the ACI in step 215. In so doing, the base station constitutes the payload to include the data, the ACI, and the padding bits. For example, the base station puts the padding bits in between the data and the ACI. Alternatively, the base station may put the padding bits between the ACI and the CRC.

Next, the base station finishes this process.

Figure 3:
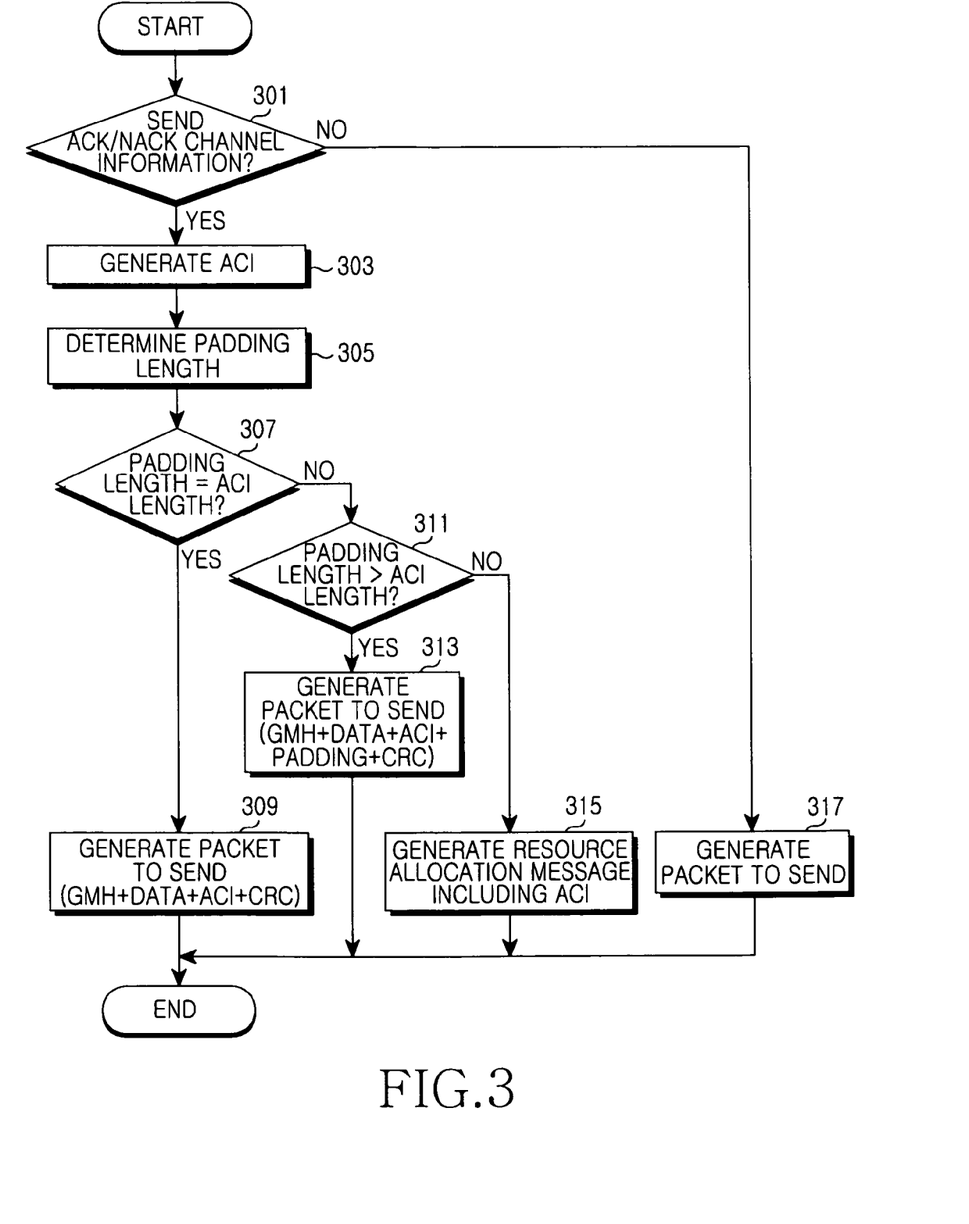
FIG. 3 illustrates a method for constituting the packet at the base station according to another exemplary embodiment of the present invention.

The base station may be able to insert the ACI into the payload as shown in FIG. 3.

FIG. 3 illustrates a method for constituting the packet at the base station according to another exemplary embodiment of the present invention.

In step 301, the base station determines whether to send the ACK/NACK channel information in relation to the data transmitted to the terminal.

When not sending the ACK/NACK channel information for the data, the base station generates the packet in step 317. For example, the base station constitutes the packet with the GMH, the payload, and the CRC. In so doing, the base station constitutes the payload to include the data and the padding bits. Alternatively, when the sizes of the data and the ARQ block are equal, the base station may constitute the payload to include only the data.

By contrast, when sending the ACK/NACK channel information for the data, the base station generates the ACI including the ACK/NACK channel allocation information with respect to the data in step 303. For example, the base station constitutes the ACI including the ACK/NACK channel indication 131 and the CRC 133 for the ACI 115 as shown in FIG. 1. Alternatively, the base station may constitute the ACI including the ACK/NACK channel indication 131.

In step 305, the base station determines the length of the padding bits. That is, the base station examines the difference of the sizes of the data transmitted to the terminal and the ARQ block.

In step 307, the base station compares the length of the padding bits determined in step 305 with the size of the ACI generated in step 303. That is, the base station determines whether the length of the padding bits is equal to the ACI size.

When the length of the padding bits is equal to the ACI size in step 307, the base station generates the packet to include the ACI in step 309. At this time, the base station constitutes the payload to include the data and the ACI. In other words, the base station inserts the ACI into the padding bit area to make the sizes of the data and the ARQ block equal in the payload.

By contrast, when the length of the padding bits is different from the ACI size in step 307, the base station determines whether the length of the padding bits is greater than the ACI size in step 311.

When the length of the padding bits is greater than the ACI size in step 311, the base station generates the packet to include the ACI in step 313. The base station constitutes the payload to include the data, the ACI, and the padding bits. For instance, the base station places the padding bits between the data and the ACI. Alternatively, the base station may put the padding bits between the ACI and the CRC.

When the length of the padding bits is smaller than the ACI size in step 311, the base station generates the resource allocation message including the ACI and the packet in step 315. For example, the base station constitutes the payload to include the data and the padding bits. Alternatively, when the sizes of the data and the ARQ block are equal, the base station may constitute the payload to include only the data. Herein, the resource allocation message including the ACI can be constituted as a common control message.

Next, the base station finishes this process.

Figure 4:
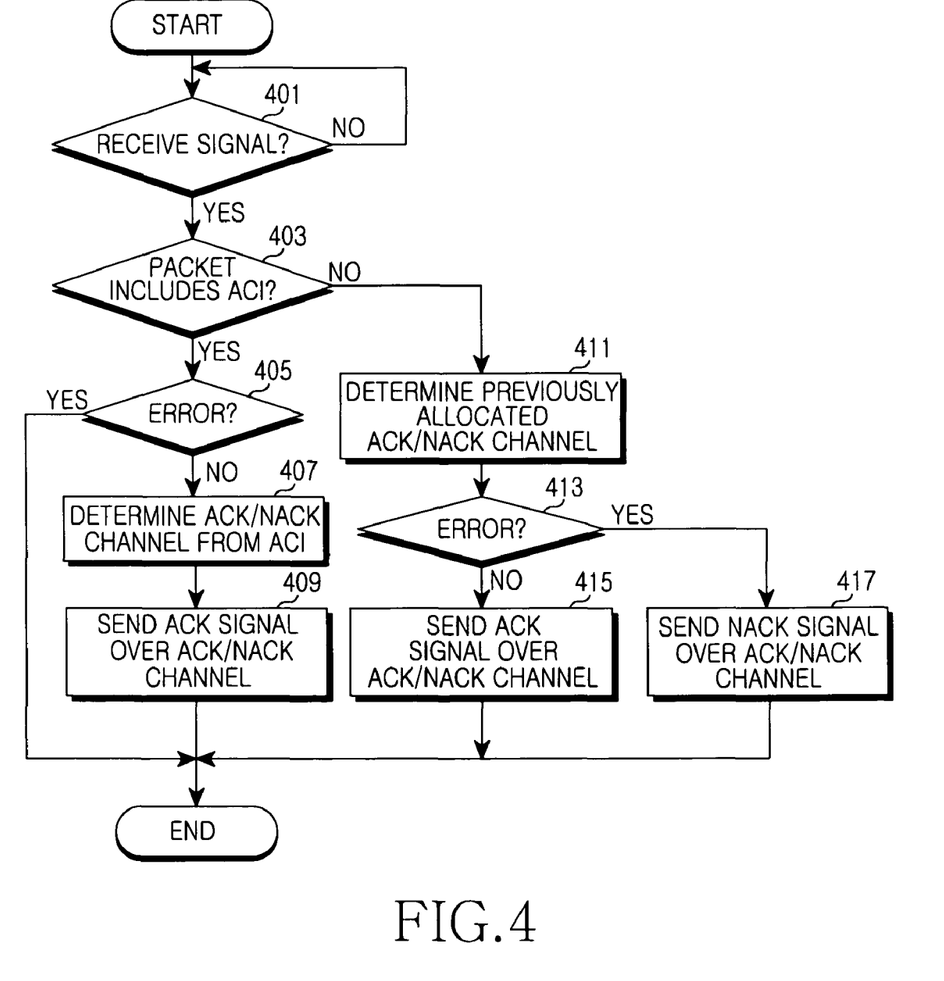
FIG. 4 illustrates a method for determining an ACK/NACK channel at a terminal according to an exemplary embodiment of the present invention.
Figure 5:
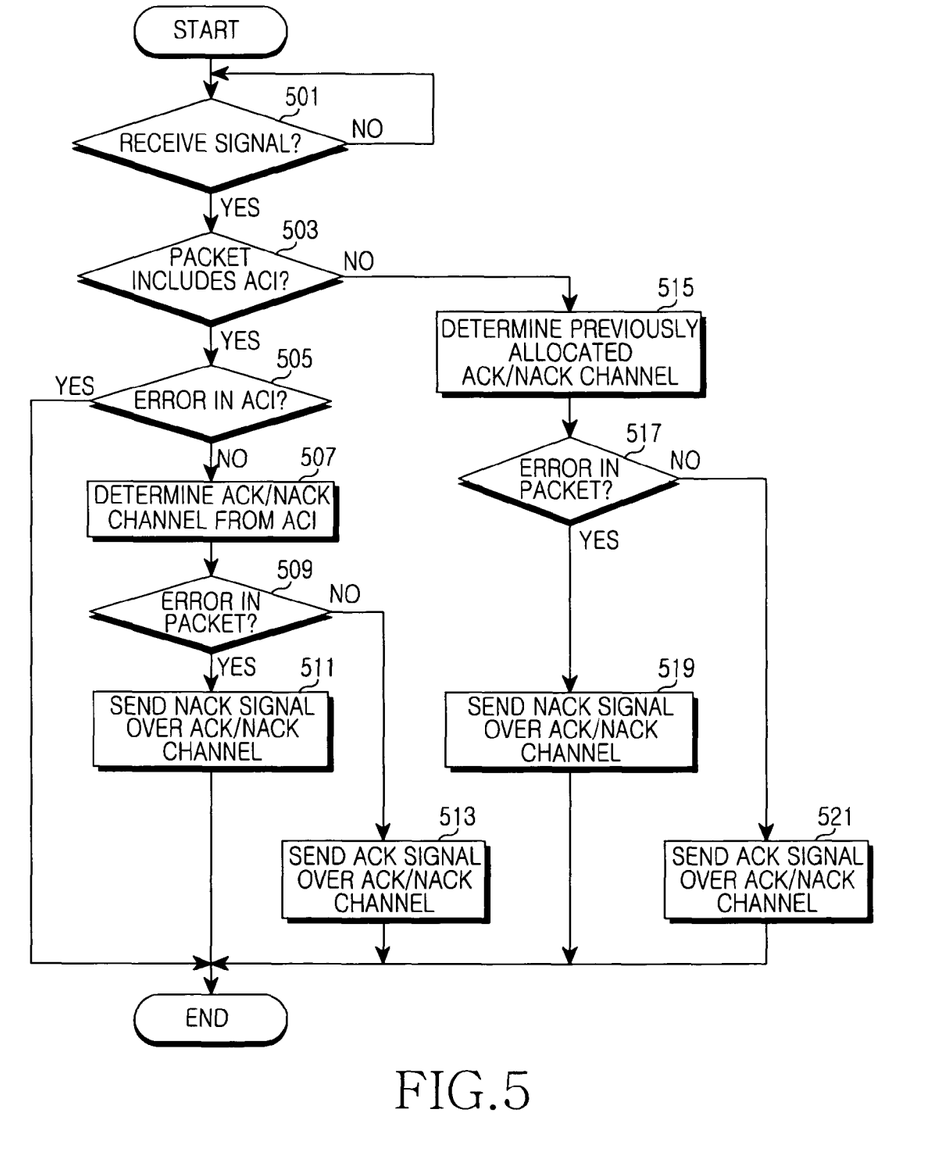
FIG. 5 illustrates a method for determining the ACK/NACK channel at the terminal according to another exemplary embodiment of the present invention.

When the base station sends the packet by inserting the ACK/NACK channel allocation information into the payload of the packet as described above, the terminal determines the ACK/NACK channel as shown in FIG. 4 or FIG. 5.

When the ACI does not include the CRC, the terminal determines the ACK/NACK channel as shown in FIG. 4.

FIG. 4 illustrates a method for determining the ACK/NACK channel at the terminal according to an exemplary embodiment of the present invention.

In step 401, the terminal determines whether a packet is received from the base station.

Upon receiving the packet from the base station, the terminal determines whether the packet includes the ACI in step 403. For example, the terminal can examine whether the ACI is contained, based on the ACK channel indication information of the GMH of the packet received from the base station.

When the packet includes the ACI, the terminal detects error of the packet in step 405. For example, the terminal determines based on the CRC of the packet whether the packet is corrupted or not.

When the packet is corrupted in step 405, the terminal recognizes that it is impossible to identify the ACK/NACK channel because the ACI of the packet is also corrupted. Thus, the terminal finishes this process. At this time, the terminal does not send the ACK/NACK information in response to the packet received in step 401.

By contrast, when the packet is free from error in step 405, the terminal recognizes that the ACI of the packet received from the base station in step 401 is also free from error. As such, the terminal determines the ACK/NACK channel for the data received from the base station based on the ACI of the packet in step 407.

In step 409, the terminal transmits ACK information over the ACK/NACK channel determined in step 407.

When the packet does not include the ACI in step 403, the terminal examines the previously allocated ACK/NACK channel in step 411. For instance, when the resource is fixedly allocated, the terminal determines the fixedly allocated ACK/NACK channel. The terminal can determine the ACK/NACK channel according to a map order assigned from the base station or be allocated the ACK/NACK channel through a common control channel.

Alternatively, using the synchronous ARQ scheme, the terminal determines the ACK/NACK channel of the original data. The terminal can determine the ACK/NACK channel of the original data according to the map order assigned from the base station or be allocated the ACK/NACK channel of the original data over the common control channel.

Alternatively, using the synchronous ARQ scheme, the terminal may determine the ACK/NACK channel with respect to the retransmission data previously received.

Next, the terminal goes to step 413 and detects error of the packet received from the base station in step 401. For example, the terminal detects error of the packet using the CRC of the packet.

When the packet is free from error in step 413, the terminal transmits ACK information over the ACK/NACK channel determined in step 411, in step 415.

When the packet is corrupted in step 413, the terminal transmits NACK information over the ACK/NACK channel determined in step 411, in step 417.

Next, the terminal finishes this process.

When the ACI includes the CRC, the terminal examines the ACK/NACK channel as shown in FIG. 5.

FIG. 5 illustrates a method for determining the ACK/NACK channel at the terminal according to another exemplary embodiment of the present invention.

In step 501, the terminal determines whether a packet is received from the base station.

Upon receiving the packet from the base station, the terminal determines whether the packet includes the ACI in step 503. For example, the terminal can examine whether the ACI is contained, based on the ACK channel indication information of the GMH of the packet received from the base station.

When the packet includes the ACI, the terminal detects error of the ACI of the packet in step 505. For example, the terminal determines based on the CRC of the ACI whether the ACI is corrupted or not.

When the ACI is corrupted in step 505, the terminal cannot determine the ACK/NACK channel for the packet received in step 501. Thus, the terminal finishes this process. At this time, the terminal does not send the ACK/NACK information in response to the packet.

By contrast, when the ACI is free from error in step 505, the terminal determines the ACK/NACK channel based on the ACI of the packet in step 507.

In step 509, the terminal detects error of the packet. For example, the terminal detects error of the packet using the CRC of the packet.

When the packet is corrupted in step 509, the terminal sends NACK information over the ACK/NACK channel determined in step 507, in step 511.

When the packet is free from error in step 509, the terminal sends ACK information over the ACK/NACK channel determined in step 507, in step 513.

When the packet does not include the ACI in step 503, the terminal identifies the previously allocated ACK/NACK channel in step 515. For example, when the resource is fixedly allocated, the terminal determines the ACK/NACK channel fixedly allocated. The terminal can determine the ACK/NACK channel according to the map order assigned from the base station or be allocated the ACK/NACK channel through the common control channel.

Alternatively, using the synchronous ARQ scheme, the terminal may determine the ACK/NACK channel of the original data. The terminal can determine the ACK/NACK channel of the original data according to the map order assigned from the base station or be allocated the ACK/NACK channel of the original data over the common control channel.

Alternatively, using the synchronous ARQ scheme, the terminal may determine the ACK/NACK channel with respect to the retransmission data previously received.

Next, the terminal goes to step 517 and detects error of the packet received from the base station in step 501. For example, the terminal detects error of the packet using the CRC of the packet.

When the packet is corrupted in step 517, the terminal transmits NACK information over the ACK/NACK channel determined in step 515, in step 519.

When the packet is free from error in step 517, the terminal proceeds to step 521 and transmits ACK information over the ACK/NACK channel determined in step 515.

Next, the terminal finishes this process.

In this exemplary embodiment, the terminal detects the error of the ACI and then detects the error of the packet. Alternatively, the terminal may be able to detect error of the packet according to the packet constitution order and then detect error of the ACI.

When it is impossible to determine the ACK/NACK channel because of the error of the ACI as aforementioned, the terminal does not send the ACK/NACK information in relation to the received packet. As a result, when receiving no ACK/NACK information for a certain time after transmitting the packet, the base station recognizes that the packet transmitted to the terminal is compromised.

Now, a structure of the base station for inserting the ACK/NACK channel allocation information into the payload is elucidated. Hereafter, the wireless communication system is assumed to adopt Orthogonal Frequency Division Multiplexing (OFDM) scheme. However, it is noted that the present invention is applicable to other communication schemes.

Figure 6:
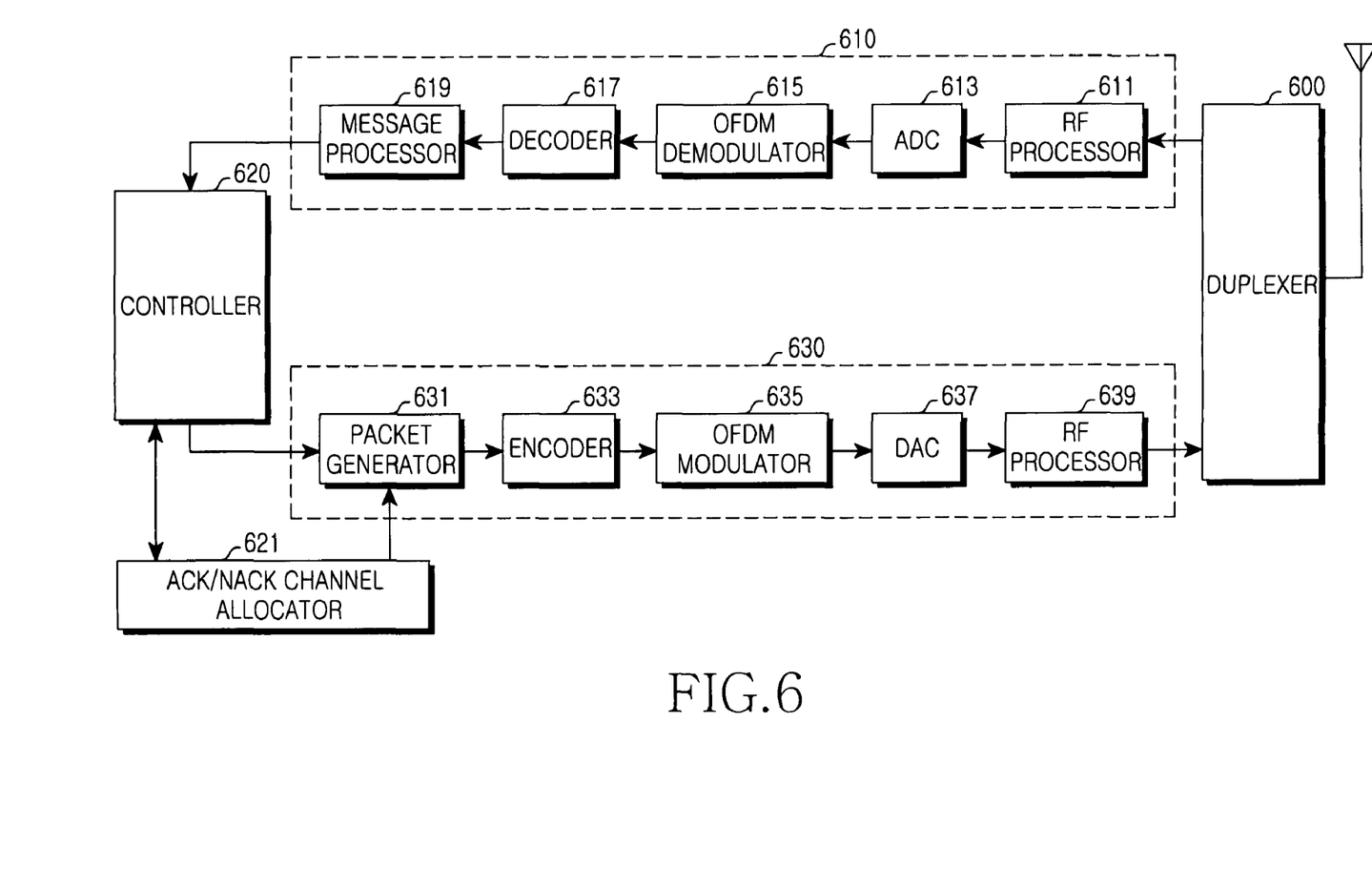
FIG. 6 illustrates the base station according to an exemplary embodiment of the present invention.

FIG. 6 illustrates a block diagram of the base station according to an exemplary embodiment of the present invention.

The base station of FIG. 6 includes a duplexer 600, a receiver 610, a controller 620, and a transmitter 630.

The duplexer 600 sends a transmit signal output from the transmitter 630 via an antenna and forwards a received signal from the antenna to the receiver 610 in the duplexing manner.

The receiver 610 includes a Radio Frequency (RF) processor 611, an Analog/Digital Converter (ADC) 613, an OFDM demodulator 615, a decoder 617, and a message processor 619.

The RF processor 611 converts an RF signal output from the duplexer 600 to a baseband analog signal. The ADC 613 converts the analog signal output from the RF processor 611 to digital sample data. The OFDM demodulator 615 converts the time-domain sample data output from the ADC 613 to frequency-domain data using Fast Fourier Transform (FFT).

The decoder 617 selects data of subcarriers to actually receive from the frequency-domain data output from the OFDM demodulator 615. Next, the decoder 617 demodulates and decodes the selected data at a preset modulation level (Modulation and Coding Scheme (MCS) level)).

The message processor 619 determines control information in the signal fed from the decoder 617 and sends the control information to the controller 620. For example, the message processor 619 determines the ACK/NACK information received over the ACK/NACK channel allocated to the terminal and sends the ACK/NACK information to the controller 620.

The controller 620 allocates the resources to the terminals to service by taking into account the channel condition of the terminals traveling in the service coverage. The controller 620 controls the data retransmission according to the ACK/NACK information provided from the message processor 619. For example, when receiving the NACK information or not receiving the ACK/NACK information for a certain time with respect to the packet transmitted to the terminal, the controller 620 recognizes the corrupted packet and thus controls to perform the retransmission.

An ACK/NACK channel allocator 621 allocates the ACK/NACK channel for the data to the terminal which sends the data, under the control of the controller 620.

The transmitter 630 includes a packet generator 631, an encoder 633, an OFDM modulator 635, and a Digital/Analog Converter (DAC) 637, and an RF processor 639. Although it is not depicted in the drawing, the transmitter 630 includes a message generator which generates the control message under the control of the controller 620. The message generator generates the resource allocation message for each individual terminal under the control of the controller 620.

The packet generator 631 generates the packet to send to the terminal under the control of the controller 620. The packet generator 631 constitutes the packet to include the ACK/NACK channel allocation information. For instance, the packet generator 631 generates the packet to carry the ACK/NACK channel allocation information in the padding bit area as shown in FIG. 1. In so doing, the packet generator 631 constitutes the payload of the packet to include the ACI based on the sizes of the data of the packet and the ARQ block as shown in FIG. 2 or FIG. 3.

As constituting the packet to include the ACK/NACK channel allocation information, the packet generator 631 may determine the modulation order of the ACK/NACK channel allocation information based on the channel condition of the terminal and insert the determined modulation order into the packet.

The encoder 633 encodes and modulates the packet output from the packet generator 631 and the control message output from the message generator at the corresponding modulation level (the MCS level). The OFDM modulator 635 converts the frequency-domain data output from the encoder 633 to time-domain sample data (OFDM symbols) through Inverse FFT (FFT).

The DAC 637 converts the sample data output from the OFDM modulator 635 to an analog signal. The RF processor 639 converts the baseband analog signal output from the DAC 637 to an RF signal.

When the modulation order of the ACK/NACK channel allocation information varies as stated above, the upper layer which constitutes the packet needs to know the ACK/NACK channel allocation information to insert to the packet. Hence, although it is not illustrated, it is necessary to connect a path for exchanging the ACI information between the packet generator 631 and the upper layer.

Now, a structure of the terminal for determining the ACK/NACK channel allocated from the base station is explained.

Figure 7:
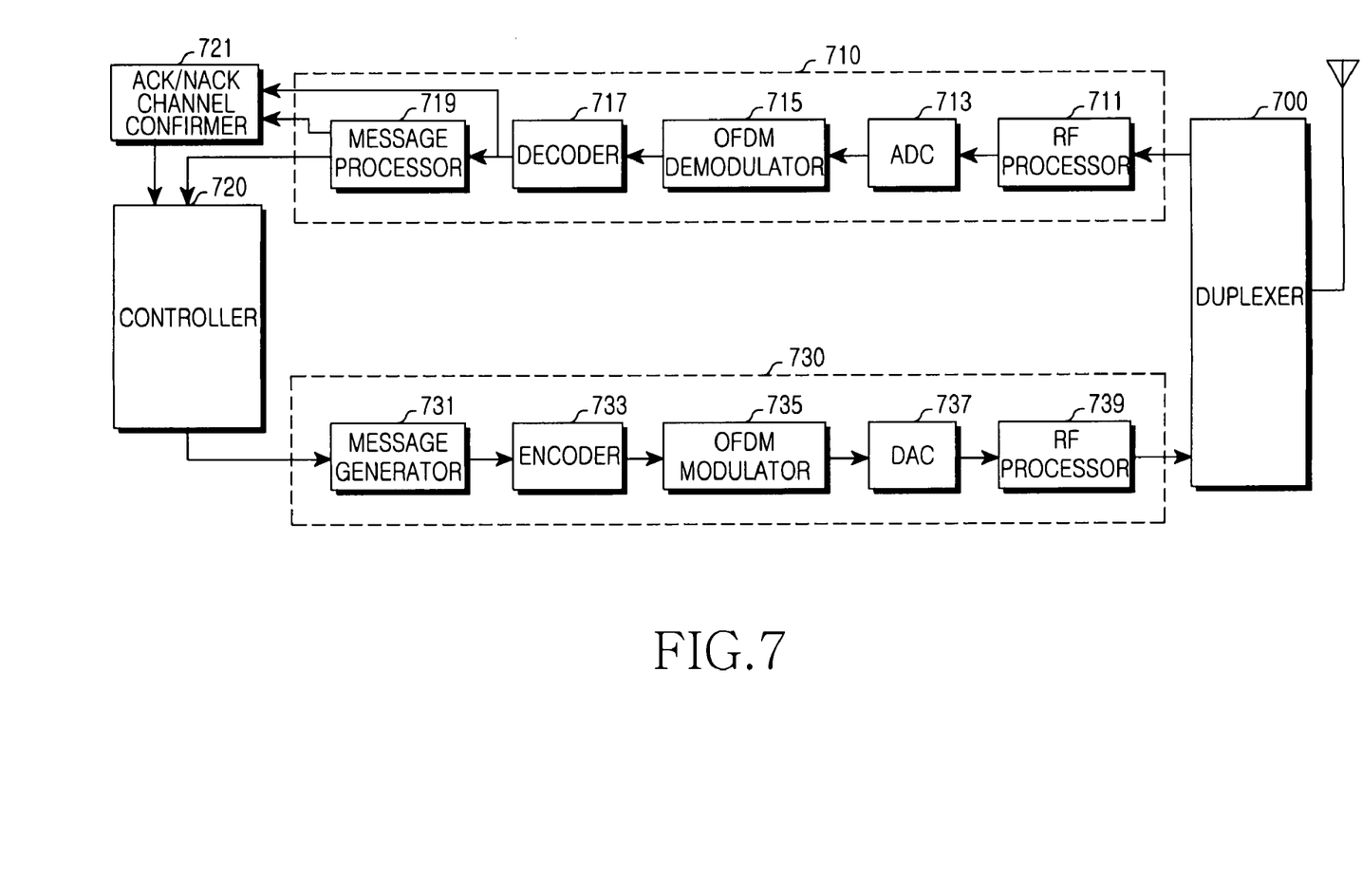
FIG. 7 illustrates the terminal according to an exemplary embodiment of the present invention.

FIG. 7 illustrates a block diagram of the terminal according to an exemplary embodiment of the present invention.

The terminal of FIG. 7 includes a duplexer 700, a receiver 710, a controller 720, and a transmitter 730.

The duplexer 700 sends a transmit signal output from the transmitter 730 via an antenna and forwards a received signal from the antenna to the receiver 710 in the duplexing manner.

The receiver 710 includes an RF processor 711, an ADC 713, an OFDM demodulator 715, a decoder 717, and a message processor 719.

The RF processor 711 converts the RF signal output from the duplexer 700 to a baseband analog signal. The ADC 713 converts the analog signal output from the RF processor 711 to digital sample data. The OFDM demodulator 715 converts the time-domain sample data output from the ADC 713 to frequency-domain data using the FFT.

The decoder 717 selects data of subcarriers to actually receive from the frequency-domain data output from the OFDM demodulator 715. Next, the decoder 717 demodulates and decodes the selected data at a preset modulation level (the MCS level).

The message processor 719 determines control information in the signal fed from the decoder 717 and sends the control information to the controller 720. For example, the message processor 719 determines the resource allocation message received from the base station and sends the message to the controller 720.

The controller 720 controls the operations of the terminal. For example, the controller 720 receives the data using the information of the resource allocated from the base station. Herein, the controller 720 determines the resource allocated from the base station through the resource allocation message output from the message processor 719.

The controller 720 detects error of the data received from the base station. The controller 720 transmits the ACK/NACK information over the ACK/NACK channel provided from an ACK/NACK channel confirmer 721. When the ACK/NACK channel confirmer 721 cannot determine the ACK/NACK channel, the controller 720 controls not to send the ACK/NACK information in relation to the received packet.

The ACK/NACK channel confirmer 721 determines the ACK/NACK channel allocated from the base station based on the ACI of the packet output from the decoder 717. For example, the ACK/NACK channel confirmer 721 determines the ACK/NACK channel allocated from the base station from the ACI of the packet as shown in FIG. 4 or FIG. 5.

When the packet does not include the ACI, the ACK/NACK channel confirmer 721 may determine the ACK/NACK channel allocated from the base station through the resource allocation message output from the message processor 719 or the common control channel. For example, the ACK/NACK channel confirmer 721 determines the ACK/NACK channel allocated from the base station according to the constitution order of the map output from the message processor 719.

When the packet does not include the ACI, the ACK/NACK channel confirmer 721 may recognize that the ACK/NACK channel previously allocated from the base station is reused.

The transmitter 730 includes a message generator 731, an encoder 733, an OFDM modulator 735, and a DAC 737, and an RF processor 739.

The message generator 731 generates and outputs the control message under the control of the controller 720. For instance, the message generator 731 generates the ACK information or the NACK information to send over the ACK/NACK channel under the control of the controller 720.

The encoder 733 encodes and modulates the transmit data and the control message output from the message generator 731 at the corresponding modulation level (the MCS level). The OFDM modulator 735 converts the frequency-domain data output from the encoder 733 to time-domain sample data (OFDM symbols) through the IFFT.

The DAC 737 converts the sample data output from the OFDM modulator 735 to an analog signal. The RF processor 739 converts the baseband analog signal output from the DAC 737 to an RF signal.

As mentioned above, without using the resource allocation message or the common control channel, the base station can insert the ACK/NACK channel allocation information to the packet and send the packet to the terminal. In case where the ACK/NACK channel of the initially transmitted data and the retransmitted data is not changed, the base station may not include the ACK/NACK channel allocation information into the packet for the retransmission data.

The base station may transmit the ACK/NACK channel allocation information using the resource allocation message or the common control channel with respect to the initially transmitted data, and transmit the packet for the retransmission data by inserting the ACK/NACK channel allocation information into the packet.

As set forth above, the base station of the wireless communication system allocates the ACK/NACK channel using the padding area of the packet. It is possible to prevent the ACK/NACK channel collision with respect to the retransmission data according to the synchronous ARQ scheme and the fixed allocation data without incurring the overhead in the ACK/NACK channel allocation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting ACK/NACK channel allocation information at a base station in a wireless communication system, the method comprising:
   generating ACK/NACK channel allocation information of a packet transmitted to a terminal;
   inserting the ACK/NACK channel allocation information into the packet using a padding area indicative of a size difference of data carried by the packet and an Automatic Repeat reQuest (ARQ) block; and
   transmitting the packet comprising the inserted ACK/NACK channel allocation information to a terminal to service.

2. The method of claim 1, wherein the ACK/NACK channel allocation information comprises location information of an ACK/NACK channel for the packet, or location information of an ACK/NACK channel for the packet and information for detecting an error of the ACK/NACK channel allocation information.

3. The method of claim 1, wherein the packet comprises a header comprising at least one of type information of the header, length information of a payload, identifier information of a receiver, and control information indicative of whether the packet comprises the ACK/NACK channel allocation information, the payload comprising at least one of data, the ACK/NACK channel allocation information, and padding bits, and information for detecting error of the packet.

4. The method of claim 1, wherein the inserting using the padding area comprises:
   determining a channel condition in relation to the terminal to which the packet is transmitted;
   encoding the ACK/NACK channel allocation information according to a modulation order determined by taking into account the channel condition with the terminal; and
   inserting the encoded ACK/NACK channel allocation information into the packet.

5. The method of claim 1, wherein the inserting using the padding area comprises:
   determining a size of the padding area; and
   when the size of the padding area is greater than or equal to a size of the ACK/NACK channel allocation information, inserting the ACK/NACK channel allocation information into the padding area.

6. The method of claim 5, further comprising:
   when the size of the padding area is smaller than the size of the ACK/NACK channel allocation information, transmitting the ACK/NACK channel allocation information through a resource allocation message or a common control channel.

7. The method of claim 5, further comprising:
   when the size of the padding area is smaller than the size of the ACK/NACK channel allocation information, expanding the size of the padding area to be equal to the size of the ACK/NACK channel allocation information by reducing the data amount carried by the packet; and
   inserting the ACK/NACK channel allocation information into the padding area.

8. A method for determining an ACK/NACK channel at a terminal in a wireless communication system, the method comprising:
   detecting an error of the ACK/NACK channel allocation information when a packet received from a base station comprises ACK/NACK channel allocation information;
   determining an ACK/NACK channel with respect to the received packet based on the ACK/NACK channel allocation information when the ACK/NACK channel allocation information is free from error; and
   transmitting ACK information or NACK information for the packet over the ACK/NACK channel according to an absence or presence of the error of the packet.

9. The method of claim 8, wherein the detecting of the error of the ACK/NACK channel allocation information comprises:
   detecting the error of the packet received from the base station; and
   detecting the error of the ACK/NACK channel allocation information according to the absence or presence of the error of the packet.

10. The method of claim 8, wherein the detecting of the error of the ACK/NACK channel allocation information comprises:
    detecting the error of the ACK/NACK channel allocation information according to error determination information of the ACK/NACK channel allocation information.

11. The method of claim 8, further comprising:
when the ACK/NACK channel allocation information is corrupted, not transmitting ACK/NACK information for the packet received from the base station.

12. A base station configured to transmit ACK/NACK channel allocation information at a base station in a wireless communication system, the base station comprising:
a packet constitutor configured to generate a packet by inserting ACK/NACK channel allocation information for a packet using a padding area indicative of a size difference of data carried by the packet and an Automatic Repeat reQuest (ARQ) block; and
a transmitter configured to transmit the packet comprising the inserted ACK/NACK channel allocation information to a terminal to service.

13. The base station of claim 12, wherein the packet constitutor is configured to generate the ACK/NACK channel allocation information comprising location information of an ACK/NACK channel for the packet, or generate the ACK/NACK channel allocation information comprising location information of an ACK/NACK channel for the packet and information for detecting error of the ACK/NACK channel allocation information.

14. The base station of claim 12, wherein the packet constitutor is configured to generate the packet which comprises a header comprising at least one of type information of the header, length information of a payload, identifier information of a receiver, and control information indicative of whether the packet comprises the ACK/NACK channel allocation information, the payload comprising at least one of data, the ACK/NACK channel allocation information, and padding bits, and information for detecting error of the packet.

15. The base station of claim 12, wherein the packet constitutor is configured to encode the ACK/NACK channel allocation information according to a modulation order determined by taking into account the channel condition with the terminal, and insert the encoded ACK/NACK channel allocation information into the packet.

16. The base station of claim 12, wherein, when a size of the padding area is greater than or equal to a size of the ACK/NACK channel allocation information, the packet constitutor inserts the ACK/NACK channel allocation information into the padding area.

17. The base station of claim 12, wherein, when the size of the padding area is smaller than the size of the ACK/NACK channel allocation information, the packet constitutor inserts the ACK/NACK channel allocation information into the padding area which is expanded by reducing the data amount carried by the packet.

18. The base station of claim 12, further comprising:
a controller configured to transmit the ACK/NACK channel allocation information through a resource allocation message or a common control message when the size of the padding area is smaller than the size of the ACK/NACK channel allocation information.

19. A mobile station configured to determine an ACK/NACK channel at a terminal in a wireless communication system, the mobile station comprising:
a receiver configured to receive a signal;
an ACK/NACK channel confirmer configured to, when ACK/NACK channel allocation information carried by a packet received through the receiver is free from error, determine an ACK/NACK channel with respect to the packet received through the receiver based on the ACK/NACK channel allocation information; and
a controller configured to transmit ACK information or NACK information for the packet over the ACK/NACK channel according to absence or presence of the error of the packet.

20. The mobile station of claim 19, wherein the ACK/NACK channel confirmer detects an error of the ACK/NACK channel allocation information according to an absence or presence of the error of the packet received through the receiver.

21. The mobile station of claim 19, wherein the ACK/NACK channel confirmer detects the error of the ACK/NACK channel allocation information according to error determination information of the ACK/NACK channel allocation information.

22. The mobile station of claim 19, wherein, when the ACK/NACK channel information is not received from the ACK/NACK channel confirmer, the controller controls not to transmit ACK/NACK information with respect to the packet received through the receiver.

* * * * *